(12) United States Patent
Horng

(10) Patent No.: US 9,879,683 B2
(45) Date of Patent: Jan. 30, 2018

(54) GAS BLOWER

(71) Applicant: Sunonwealth Electric Machine Industry Co., Ltd., Kaohsiung (TW)

(72) Inventor: Alex Horng, Kaohsiung (TW)

(73) Assignee: SUNONWEALTH ELECTRIC MACHINE INDUSTRY CO., LTD., Kaohsiung (TW)

( * ) Notice: Subject to any disclaimer, the term of this patent is extended or adjusted under 35 U.S.C. 154(b) by 550 days.

(21) Appl. No.: 14/226,919

(22) Filed: Mar. 27, 2014

(65) Prior Publication Data

US 2015/0152872 A1 Jun. 4, 2015

(30) Foreign Application Priority Data

Dec. 2, 2013 (TW) .............................. 102144123 A

(51) Int. Cl.
*F16C 23/00* (2006.01)
*H02K 5/124* (2006.01)
(Continued)

(52) U.S. Cl.
CPC ........... *F04D 19/002* (2013.01); *F04D 17/16* (2013.01); *F04D 25/0606* (2013.01);
(Continued)

(58) Field of Classification Search
CPC .. F04D 19/002; F04D 25/0606; F04D 29/083; F04D 17/16; F04D 29/668;
(Continued)

(56) References Cited

U.S. PATENT DOCUMENTS 2,446,243 A * 8/1948 Reynolds ................. F16J 15/36
156/293
3,997,805 A * 12/1976 Dochterman ........... F16C 33/76
277/391
(Continued)

FOREIGN PATENT DOCUMENTS

DE 19546250 A1 6/1997
DE 10204037 A1 8/2003
(Continued)

*Primary Examiner* — Devon Kramer
*Assistant Examiner* — Thomas Cash
(74) *Attorney, Agent, or Firm* — Alan D. Kamrath; Kamrath IP Lawfirm, P.A.

(57) ABSTRACT

A gas blower includes a housing, a motor and a resilient sealing member for safety improvement. The housing has a receiving space and receives a fan wheel inside the receiving space, and the housing has an inlet and an outlet in communication with the receiving space. The motor has a base and a shaft. The base couples with the housing, and the shaft rotatably couples with the base and firmly connects with the fan wheel. The resilient sealing member is arranged between the housing and the base and is in a ring shape. The resilient sealing member has a central through hole for the shaft to extend through, a radial extending portion extending in radial directions of the shaft, a first surface and a second surface opposite to the first surface, with the first and second surfaces abutting against the housing and the base respectively.

20 Claims, 9 Drawing Sheets

(51) Int. Cl.
*H02K 7/14* (2006.01)
*F04D 17/16* (2006.01)
*F04D 19/00* (2006.01)
*F04D 25/06* (2006.01)
*F04D 29/08* (2006.01)
*H02K 5/173* (2006.01)
*H02K 5/136* (2006.01)
*F16C 35/077* (2006.01)
*F04D 29/059* (2006.01)
*F04D 29/66* (2006.01)
*F16J 15/02* (2006.01)
*H02K 5/24* (2006.01)

(52) U.S. Cl.
CPC .......... *F04D 29/083* (2013.01); *F16C 35/077* (2013.01); *H02K 5/136* (2013.01); *H02K 5/173* (2013.01); *H02K 5/1735* (2013.01); *F04D 29/059* (2013.01); *F04D 29/668* (2013.01); *F16C 2360/44* (2013.01); *F16C 2380/26* (2013.01); *F16J 15/02* (2013.01); *H02K 5/124* (2013.01); *H02K 5/24* (2013.01); *H02K 7/14* (2013.01)

(58) Field of Classification Search
CPC ..... F04D 29/059; F04D 29/08; H02K 5/1735; H02K 5/136; H02K 5/173; H02K 7/14; H02K 5/124; H02K 5/24; H02K 5/1732; F16J 15/02; F16J 15/32; F16J 15/3268; F16J 15/3276; F16J 15/3204; F16J 15/3228; A61M 16/0066; A61M 2205/42
USPC ..... 277/553, 565, 315, 634, 504, 38, 70, 90; 417/423.11, 423.12, 423.9; 310/89, 90
See application file for complete search history.

(56) References Cited

U.S. PATENT DOCUMENTS 4,244,589 A * 1/1981 St Laurent, Jr. ......... F16J 15/52
277/634
2007/0247009 A1 10/2007 Hoffman et al.
2012/0269620 A1* 10/2012 Boening ................ F01D 25/24
415/203

FOREIGN PATENT DOCUMENTS

| | | |
|---|---|---|
| EP | 0668650 A1 | 8/1995 |
| EP | 0668650 B1 | 8/1998 |
| GB | 2258766 A | 2/1993 |
| JP | 2004162720 A | 6/2004 |
| JP | 2011001939 A | 1/2011 |
| JP | 2013185563 A | 9/2013 |
| TW | 201108924 A | 3/2011 |
| TW | M441730 U | 11/2012 |
| WO | WO2010145890 A1 | 12/2010 |

* cited by examiner

GAS BLOWER

BACKGROUND OF THE INVENTION

1. Field of the Invention

The present invention generally relates to a gas blower; and, more particularly, it relates to a gas blower with an impellent fan wheel for gas driving.

2. Description of the Related Art

Referring to FIG. 1, a German patent with publication number of 10204037 is shown. The patent discloses a conventional gas blower 9, which is usually adapted to drive inflammable gas such as coal gas and natural gas or noxious gas such as carbon monoxide (CO) and hydrogen sulfide ($H_2S$), including a housing 91 and a motor 92. The housing 91 receives a fan wheel 911, and the motor 92 has a base 921 and a shaft 922. The base 921 connects with the housing 91, and the shaft 922 rotatably couples with the base 921 and is firmly combined with the fan wheel 911. With these elements, for driving gas by the conventional gas blower 9, the shaft 922 as well as the fan wheel 911 turns, and, thus, the gas can be drawn into the housing 91 via an inlet thereof and exhausted out of the housing 91 via an outlet. Since this conventional gas blower 9 is designed for driving inflammable or noxious gas, there is a flexible sealing member 93 arranged between the housing 91 and the base 921 to air-tightly separate the motor 92 and the housing 91, to prevent the driven gas from entering into the motor 92 and thus to avoid the inflammable or noxious gas leaking out of the blower 9 in an undesirable way. Specifically, in order to provide an ideal sealing performance, the flexible sealing member 93 is usually made by flexible material.

Unfortunately, although the flexible sealing member 93 such as an elastic ring sandwiched between the housing 91 and the base 921 and surely separating the housing 91 and the motor 92, the flexible sealing member 93 may easily deform and result in gas leakage if the pressure of the gas in the housing 91 is large enough. Specifically, around the shaft 922, an outer part 931 of the flexible sealing member 93 is curved radially to abut against the housing 91 and the motor 92. However, when the pressure inside the housing 91 is large enough, a gap between the outer part 931 of the flexible sealing member 93 and the housing 91 can be formed easily due to deformation of the flexible sealing member 93, and thus largely increase the possibility in occurrence of accident since the gas can leak out via said gap.

As a result, it is necessary to improve the conventional gas blower 9, to lower the possibility of gas leakage.

SUMMARY OF THE INVENTION

It is therefore the objective of this invention to provide a gas blower, which includes a resilient sealing member between a housing and a motor. The resilient sealing member has a radial extending portion abutting against the housing and a base of the motor, and a surface of the radial extending portion has an annular flange for the surface to abut against the housing or base through the annular flange, to improve the safety in use of the gas blower.

Another objective of this invention is providing a gas blower. A resilient sealing member of the gas blower has an axial extending portion formed on a periphery of a central through hole, and the axial extending portion extends into a shaft tube from a position close to a through hole of a housing to separate the through hole and the shaft tube, to lower the possibility of leakage.

One embodiment of the invention discloses a gas blower, which includes a housing, a motor and a resilient sealing member. The housing has a receiving space and receives a fan wheel inside the receiving space. The housing has an inlet and an outlet in communication with the receiving space. The motor has a base and a shaft. The base couples with the housing, and the shaft rotatably couples with the base and firmly connects with the fan wheel. The resilient sealing member is arranged between the housing and the base and is in a ring shape. The resilient sealing member has a central through hole for the shaft to extend through, a radial extending portion extending in radial directions of the shaft, a first surface and a second surface opposite to the first surface, with the first and second surfaces abutting against the housing and the base respectively.

In a preferred form shown, the resilient sealing member has an annular flange on one of the first and second surfaces, and said one of the first and second surfaces having the annular flange abuts with the housing or the base through the annular flange.

In the preferred form shown, the resilient sealing member has another annular flange, with the two annular flanges arranged on the first and second surfaces respectively. The first surface abuts with the housing through the annular flange on the first surface, and the second surface abuts with the base through the annular flange on the second surface.

In the preferred form shown, the two annular flanges are aligned with each other in an axial direction of the shaft.

In the preferred form shown, the two annular flanges are misaligned with each other in an axial direction of the shaft.

In the preferred form shown, another one or more annular flanges are arranged on the one of the first and second surfaces.

In the preferred form shown, the annular flange is arranged at an outer free edge of a radial extending portion away from the central through hole.

In another preferred form shown, the radial extending portion is in a disk shape and abuts with both the housing and the base in an axial direction of the shaft.

In still another preferred form shown, the housing further has a through hole in communication with the receiving space. The base of the motor has a shaft tube, and the shaft tube is in alignment with the through hole of the housing and the central through hole of the resilient sealing member. The shaft extends through the shaft tube, the through hole and the central through hole to connect with the fan wheel.

In the preferred form shown, the resilient sealing member further has an axial extending portion formed on a periphery of the central through hole and extending in an axial direction of the shaft. The axial extending portion extends into the shaft tube and abuts against an inner periphery of the shaft tube.

In the preferred form shown, a bearing is received inside the shaft tube and couples with the shaft. The axial extending portion inside the shaft tube is arranged between the bearing and the shaft tube, and the axial extending portion has an annular lip extending toward the shaft to cover said bearing.

In the preferred form shown, the gas blower further comprises a buffer washer surrounding the shaft and sandwiched by the fan wheel and an inner ring of said bearing.

In the preferred form shown, a bearing and a buffer member are arranged inside the shaft tube, and the bearing couples with the shaft. The buffer member is axially arranged between the bearing and an inner protrusion of the shaft tube and abuts with an outer ring of the bearing and the inner protrusion of the shaft tube by two ends respectively.

In the preferred form shown, the shaft couples with a permanent magnet module. A bearing and a buffer member are arranged inside the shaft tube, and the bearing couples with the shaft. The buffer member is axially arranged between the bearing and the permanent magnet module and abuts with an inner ring of said bearing and the permanent magnet module by two ends respectively.

In the preferred form shown, the shaft has an engaging groove. A fixing plate is disposed in the housing and couples with the fan wheel and the engaging groove.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
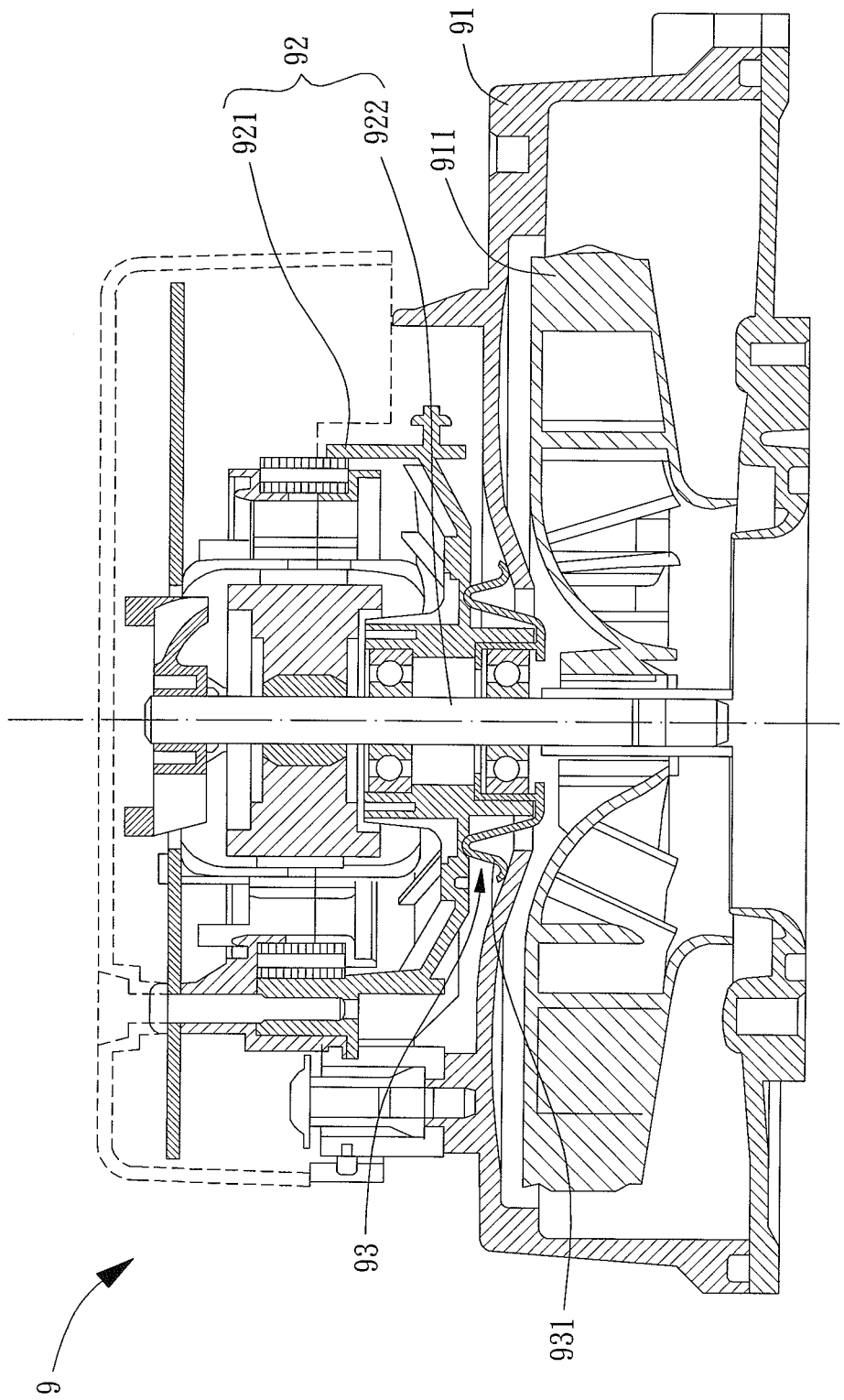
FIG. 1 is a cross-sectional view of a conventional gas blower.

In the various figures of the drawings, the same numerals designate the same or similar parts. Furthermore, when the term "first," "second," "third," "fourth," "fifth," "inner," "outer," and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
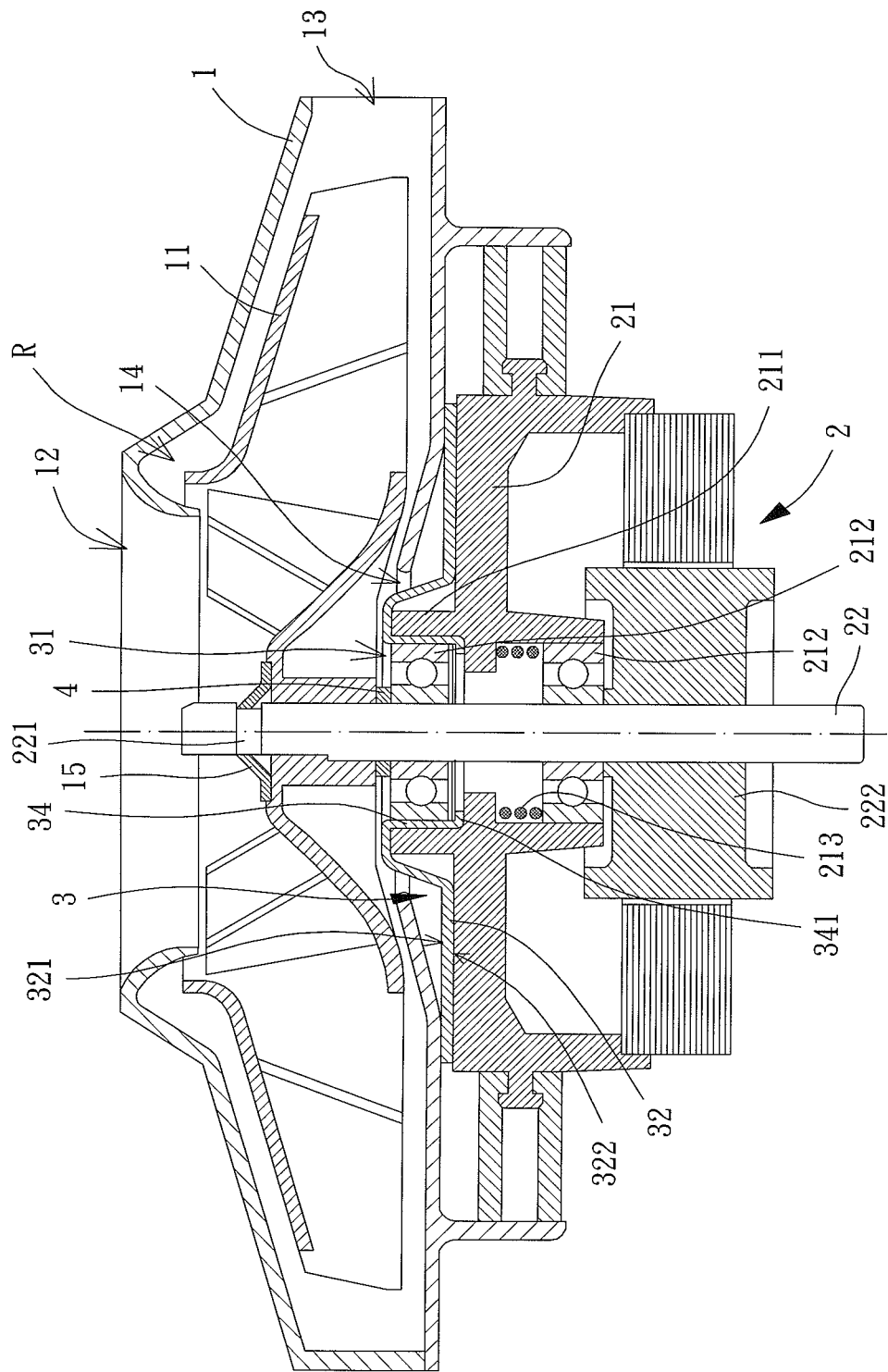
FIG. 2 is a cross-sectional view of a gas blower according to a first embodiment of the invention.

Referring to FIG. 2, a first embodiment of a gas blower of the invention includes a housing 1, a motor 2, and a resilient sealing member 3. The housing 1 couples with the motor 2, and the resilient sealing member 3 is arranged between the housing 1 and motor 2. Specifically, there is a receiving space "R" formed inside the housing 1 to receive a fan wheel 11, and the housing 1 has an inlet 12 and an outlet 13 communicating with the receiving space "R". Furthermore, the housing 1 further has a through hole 14 in communication with the receiving space "R."

In the present embodiment, although the motor 2 shown in FIG. 2 is an internal rotor motor, it can also be an external rotor motor. The motor 2 includes a base 21 and a shaft 22 rotatably coupling with the base 21, and the motor 2 couples with the housing 1 by the base 21. The base 21 includes a shaft tube 211 in alignment with the through hole 14 of the housing 1, and the shaft 22 passes through the shaft tube 211 and the through hole 14 to connect with the fan wheel 11. Accordingly, the shaft 22 can drive the fan wheel 11 to turn when in rotation. Preferably, the shaft 22 has an engaging groove 221, and a fixing plate 15 is disposed in the housing 1 and coupled with the fan wheel 11 and the engaging groove 221. Therefore, the fixing plate 15 can surely avoid the disengagement of the shaft 22 from the fan wheel 11 as well as the relative rotation between the fan wheel 11 and shaft 22.

Particularly, there is a bearing 212 inside the shaft tube 211 for the shaft 22 to couple with, and, thus, the shaft 22 is supported by the bearing 212 and able to rotate stably. Furthermore, it is preferable that the shaft tube 211 also has a buffer member 213 such as a spring or other conventional resilient buffer device. The buffer member 213 is axially arranged between the bearing 212 and an inner protrusion of the shaft tube 211 and abuts against an outer ring of the bearing 212 and the inner protrusion of the shaft tube 211 by two ends respectively. With the buffer member 213, vibration of the shaft 22 in operation can be effectively dampened. Therefore, the above design not only improves the operational stability of the gas blower, but also reduces the chance to improperly press the resilient sealing member 3 by the base 21 due to the vibration of the shaft 22.

The resilient sealing member 3 is arranged between the housing 1 and the base 21 of the motor 2, which is preferably made by flexible material such as rubber, silica gel or plastic. The resilient sealing member 3 is in the shape of a ring with a central through hole 31, and the central through hole 31 is in alignment with the through hole 14 of the housing 1 and the shaft tube 211 of the base 21 for the shaft 22 of the motor 2 to extend through. The resilient sealing member 3 includes a radial extending portion 32, which extends outwards from the central through hole 31 in radial directions of the shaft 22 to form a flat outer part sandwiched between the housing 1 and the base 21. Particularly, the radial extending portion 32 includes a first surface 321 and a second surface 322 opposite to each other, with the first and second surfaces 321, 322 abutting against the housing 1 and the base 21 respectively, for the radial extending portion 32 to be tightly clamped therebetween in the axial direction of the shaft 22.

Additionally, the resilient sealing member 3 further has an axial extending portion 34 formed on a periphery of the central through hole 31 and extending in the axial direction of the shaft 22. The axial extending portion 34 may couple with the radial extending portion 32. Specifically, the axial extending portion 34 extends from a position close to the through hole 14 of the housing 1, inserts into the shaft tube 211 of the base 21, and abuts against an inner periphery of the shaft tube 211. In this embodiment, the shaft tube 211 has two bearings 212 for the shaft 22 of the motor 2 to extend and rotatably couple therewith. Thus, the shaft 22 extends through the two bearings 212, the central through hole 31 of the resilient sealing member 3 and the through hole 14 of the housing 1 to firmly combine with the fan wheel 11. Preferably, the axial extending portion 34 inside the shaft tube 211 is sandwiched by one of the bearings 212 and the shaft tube 211. Namely the axial extending portion 34 abuts against the inner periphery of the shaft tube 211 and an outer periphery of the bearing 212. Moreover, it is preferable that a free end of the axial extending portion 34 inside the shaft tube 211 further has an annular lip 341 extending toward the shaft 22, to further cover the bearing 212. The gas blower of the first embodiment further has a buffer washer 4 made by rubber or other conventional resilient material. The buffer washer 4 surrounds the shaft 22 and is sandwiched by the fan wheel 11 and an inner ring of the bearing 212, to absorb the vibration generated by the fan wheel 11 during the rotation thereof. Therefore, with the buffer washer 4, the housing 1 does not improperly press the resilient sealing member 3 when the fan wheel 11 turns, and the gas in said receiving space "R" is also prevented from entering the motor 2 via any gap between the shaft 22 and the bearing 212.

In operation, the fan wheel 11 inside the housing 1 rotates with the shaft 22 when the motor 2 runs. Thus, the gas blower drives gas to enter the housing 1 via the inlet 12 and then be exhausted through the outlet 13. With the resilient sealing member 3 between the housing 1 and the base 21 of the motor 2, which has the radial extending portion 32 in a disk shape which is uneasy to be deformed and air-tightly abutting against the housing 1 and base 21 by the first and second surfaces 321, 322 respectively in the axial direction of the shaft 22, the radial extending portion 32 does not deform when the first surface 321 suffers large pressure from the gas inside the housing 1, since the second surface 322 is stably supported by the base 21. Therefore, the air-tight connection between the pressed first surface 321 and housing 1 is kept well to avoid any gap between the resilient sealing member 3 and the housing 1. Thus, there is no leakage of the gas inside the housing 1 toward the motor 2. As a result, in comparison with the conventional gas blower 9 shown in FIG. 1, the safety in use of the proposed gas blower is surely improved.

Moreover, with the central through hole 31 having the axial extending portion 34 formed on the periphery thereof in which the axial extending portion 34 extends into the shaft tube 211 of the base 21 from a position close to the through hole 14 of the housing 1 to abut against the inner periphery of the shaft tube 211 and the outer periphery of the bearing 212, the axial extending portion 34 can separate the through hole 14 and the shaft tube 211. Additionally, since the annular lip 341 extends toward the shaft 22 to further cover said bearing 212, a desirable air-tight situation is also formed between the shaft tube 211 and the bearing 212. Accordingly, the axial extending portion 34 makes sure that the gas in the housing 1 cannot enter the motor 2 via the through hole 14 and the shaft tube 211, and thus further improves the performance in leakage prevention.

Figure 3:
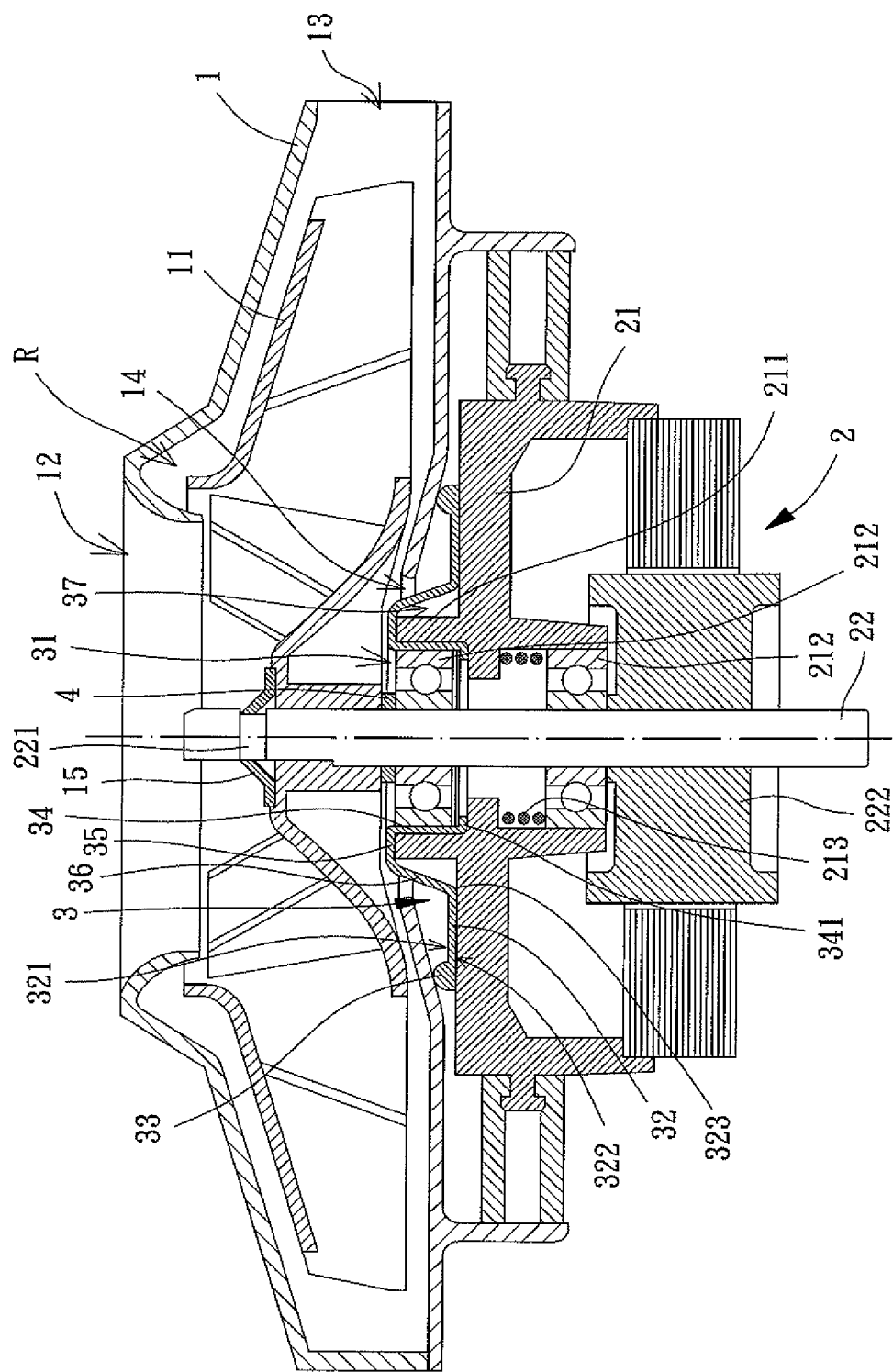
FIG. 3 is a cross-sectional view of a gas blower according to a second embodiment of the invention.
Figure 4:
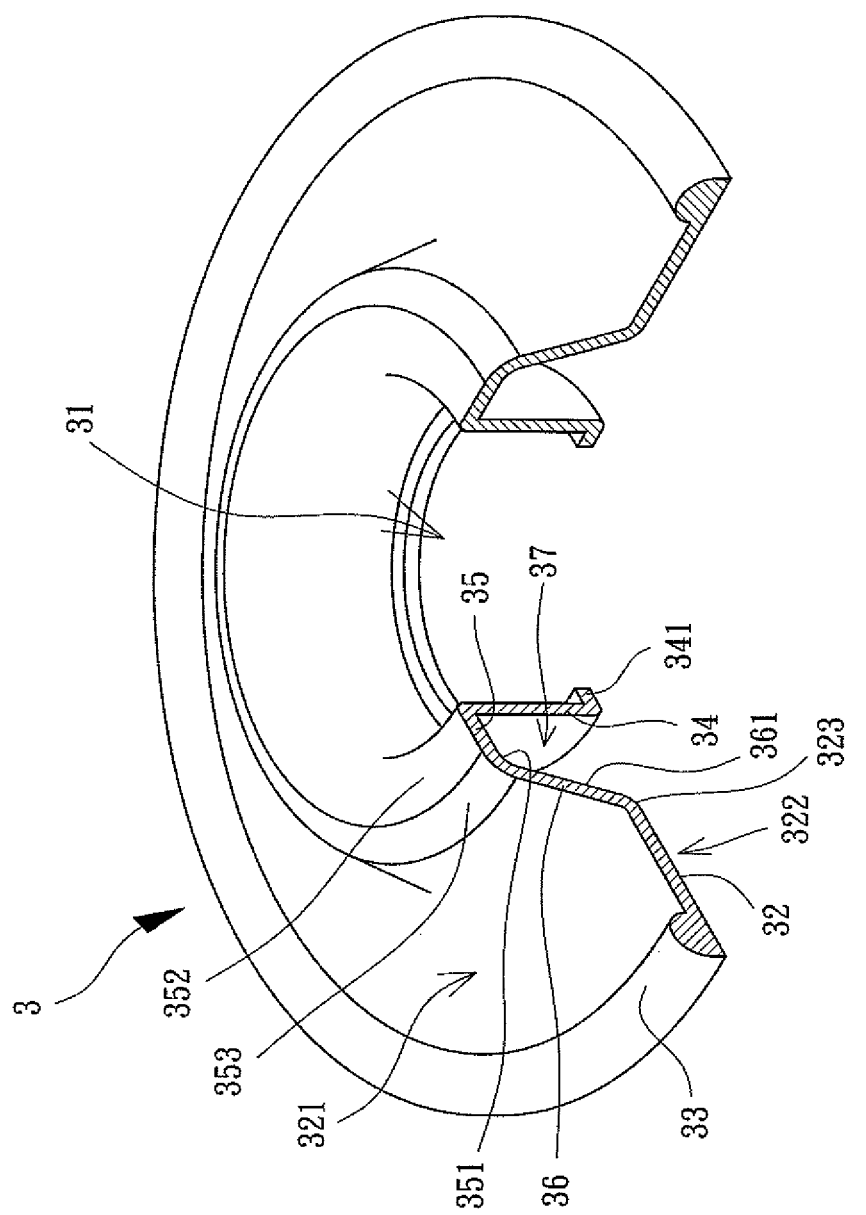
FIG. 4 is a perspective view of a resilient sealing member of the gas blower according to the second embodiment.

Referring to FIGS. 3 and 4, a second embodiment of a gas blower of the invention is shown. In comparison with the first embodiment, the radial extending portion 32 of the gas blower of the second embodiment further includes an annular flange 33 protruding from a surface of the radial extending portion 32 in the axial direction of the shaft 22 to abut against the housing 1 or the base 21. In this embodiment, the annular flange 33 is formed on the first surface 321 of the radial extending portion 32, so that the first surface 321 abuts against the housing 1 via the annular flange 33. Therefore, with the annular flange 33 protruding from the first surface 321 to provide an increased thickness of the radial extending portion 32, the radial extending portion 32 can be clamped between the housing 1 and the base 21 tighter than that in the first embodiment. Preferably, the annular flange 33 is arranged at an outer free edge of the radial extending portion 32 away from the central through hole 31, to further ensure that the whole outer periphery of the radial extending portion 32 does not deform easily. Accordingly, the performance in prevention of a gap formed between the resilient sealing member 3 and the housing 1 is thus improved.

Similar to the first, third, fourth, and fifth embodiments, the resilient sealing member 3 of the second embodiment also includes a transition section 35 extending radially outward from an end of the axial extending portion 34 opposite to the annular lip 341 and having an outer end radially outwards of the axial extending portion 34. The radial extending portion 32 includes an inner end 323 radially inwards of the annular flange 33. An outer end 351 of the transition section 35 is spaced from the inner end 323 of the radial extending portion 32 in the axial direction and in a radial direction perpendicular to the axial direction. The resilient sealing member 3 further includes an inclined section 36 extending between the outer end 351 of the transition section 35 and the inner end 323 of the radial extending portion 32. The axial extending portion 34, the transition section 35, and the inclined section 36 together define a compartment 37. A portion of the shaft tube 211 is received in the compartment 37. The portion of the shaft tube 211 includes an end face abutting the transition section 35. In this embodiment, the transition section 35 includes an annular, flat abutting portion 352 and an annular arcuate portion 353 having the outer end 351 of the transition section 35. The end face of the portion of the shaft tube 211 abuts the annular, flat abutting portion 352. The annular arcuate portion 353 is interconnected between the annular, flat abutting portion 352 and the inclined section 36. The portion of the shaft tube 211 received in the compartment 37 is spaced from an inner face 361 of the inclined section 36 in the radial direction.

Figure 5:
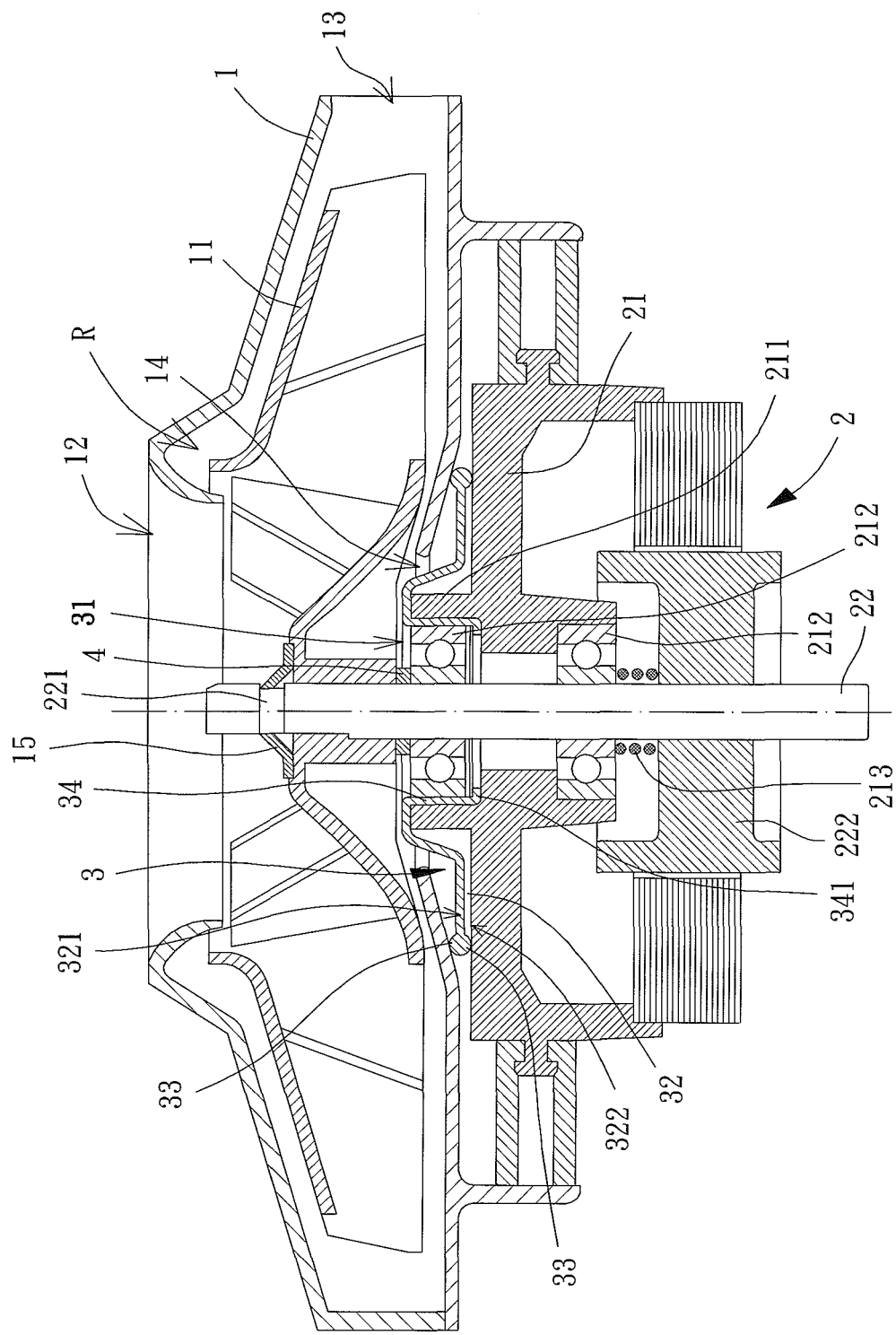
FIG. 5 is a cross-sectional view of a gas blower according to a third embodiment of the invention.
Figure 6:
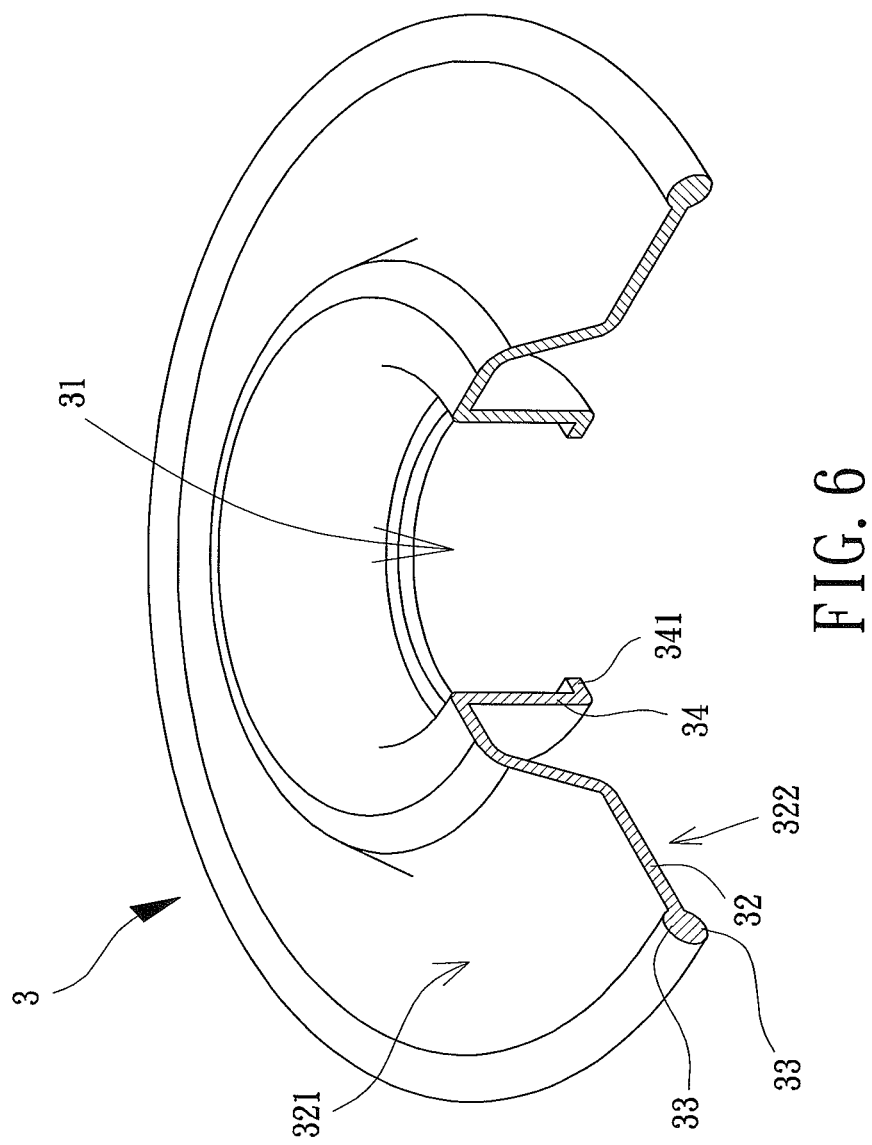
FIG. 6 is a perspective view of a resilient sealing member of the gas blower according to the third embodiment.

Referring to FIGS. 5 and 6, a third embodiment of a gas blower of the invention is shown. In comparison with the first and second embodiments, the radial extending portion 32 of the gas blower of the third embodiment further includes two annular flanges 33 respectively protruding from the first and second surfaces 321, 322 of the radial extending portion 32 in the axial direction of the shaft 22 to abut against the housing 1 and the base 21. Specifically, these two annular flanges 33 are oppositely arranged and align with each other in the axial direction of the shaft 22. With the two annular flanges 33, the structural strength of the radial extending portion 32 is improved, and, thus, the resilient sealing member 3 can keep its original shape under a larger pressure caused by the gas inside the housing 1. Furthermore, another difference between this embodiment and the former two embodiments lies in that the buffer member 213 is arranged between one of the bearing 212 and a permanent magnet module 222, with the permanent magnet module 222 coupling with the shaft 22. Specifically, the buffer member 213 abuts against an inner ring of the bearing 212 and the permanent magnet module 222 by two ends. With this change in position of the buffer member 213, the buffer member 213 damps the vibration of the shaft 22 in operation, but also is much easier to be installed in the gas blower than those of the previous embodiments.

Figure 7:
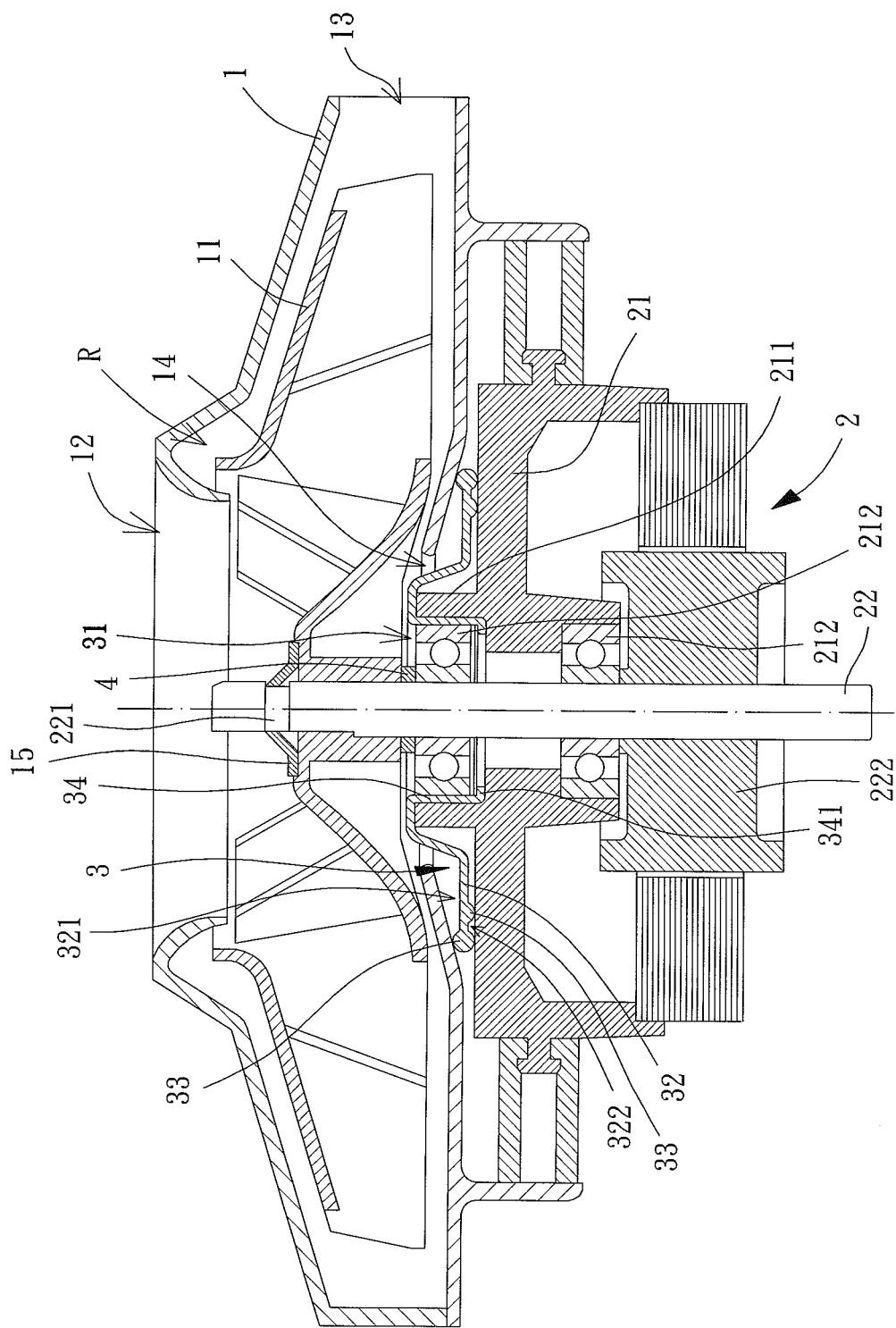
FIG. 7 is a cross-sectional view of a gas blower according to a fourth embodiment of the invention.
Figure 8:
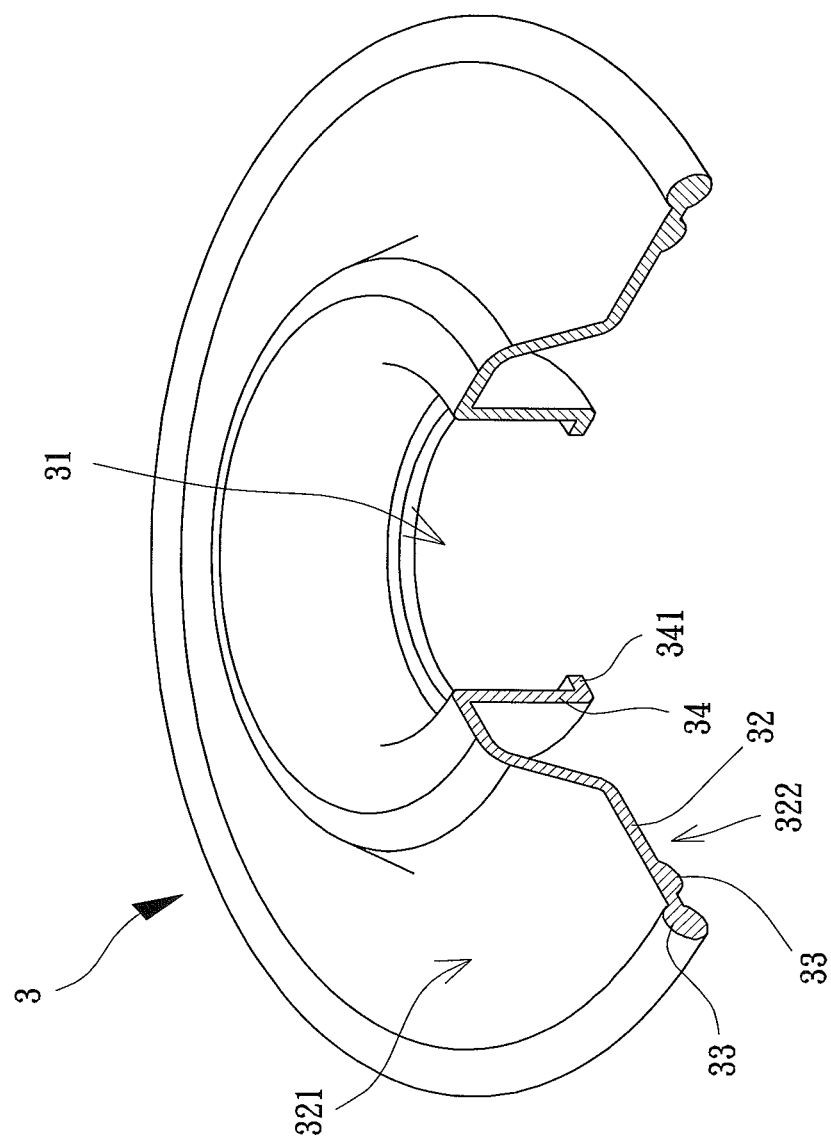
FIG. 8 is a perspective view of a resilient sealing member of the gas blower according to the fourth embodiment.

Referring to FIGS. 7 and 8, a fourth embodiment of a gas blower of the invention is shown. The difference between the fourth embodiment and the third one lies in that the radial extending portion 32 of the gas blower of this embodiment includes a plurality of annular flanges 33. In other words, the number of the annular flanges 33 on the first surface 321 or second surface 322 can be single or plural. Therefore, there can be a plurality of annular flanges 33 disposed in the positions where the radial extending portion 32 can be easily deformed, to further enhance the strength of the resilient sealing member 3.

Figure 9:
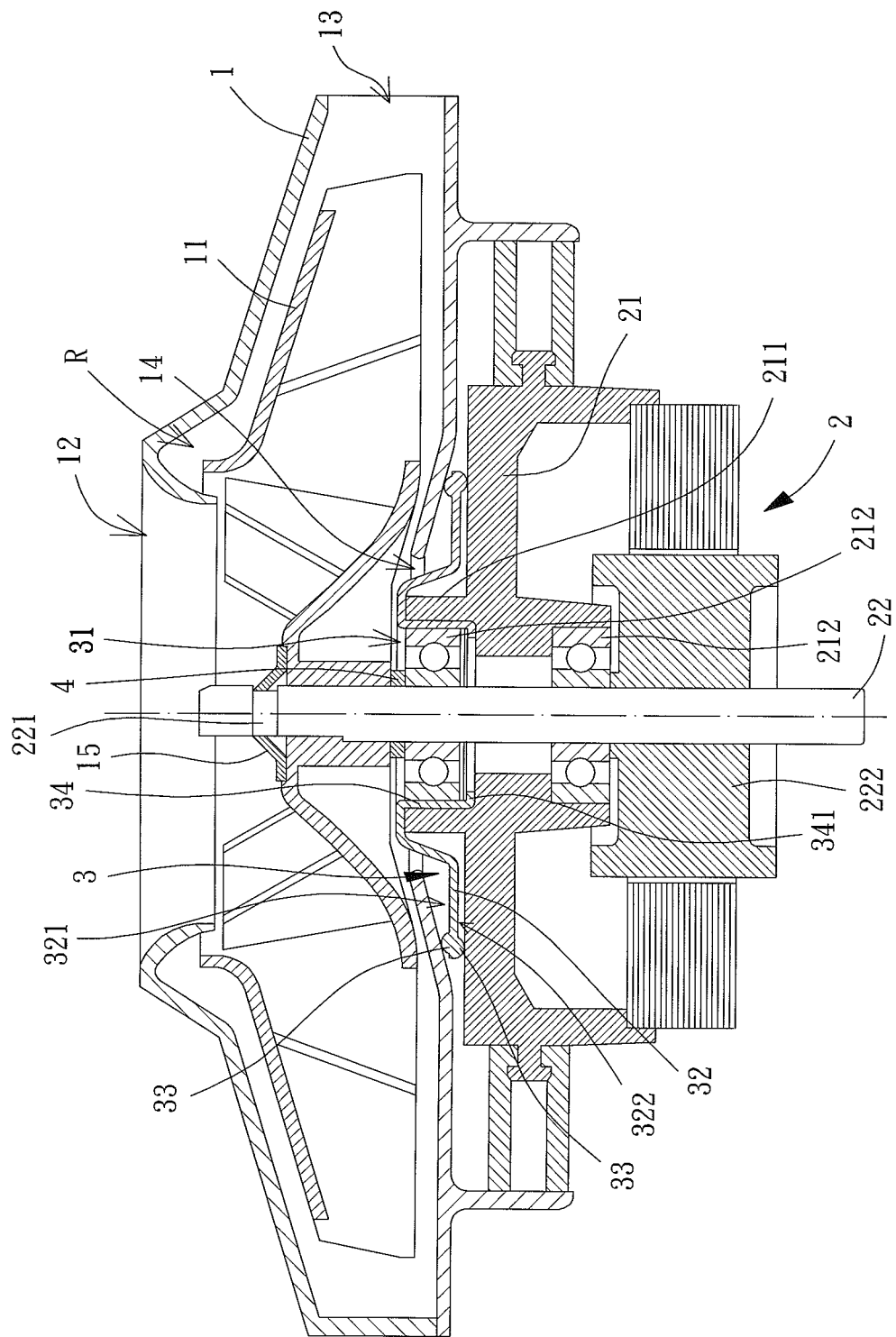
FIG. 9 is a cross-sectional view of a gas blower according to a fifth embodiment of the invention.

Finally, referring to FIG. 9, a fifth embodiment of a gas blower of the invention is shown. In comparison with the third embodiment where the two annular flanges 33 are aligned with each other in the axial direction of the shaft 22, there are also two annular flanges 33 in the fifth embodiment that are respectively arranged on the first and second surfaces 321, 322 respectively, but these two annular flanges 33 in the fifth embodiment are misaligned with each other in the axial direction. Specifically, since the pressure upon the resilient sealing member 3 is majorly caused by the gas in the housing 1, it is preferable that the annular flange 33 on the first surface 321 is closer than the annular flange 33 on the second surface 322 to the central through hole 31. Accordingly, when the gas pressure is large and presses the first surface 321, the annular flange 33 on the second surface 322 can stably support the radial extending portion 32 to avoid deformation, and thus further enhance the structural strength of the radial extending portion 32.

In sum, the above illustrated embodiments of the gas blower can surely improve the safety in use and lower the possibility in gas leakage.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A gas blower comprising:
a housing having a receiving space and receiving a fan wheel inside the receiving space, wherein the housing has an inlet and an outlet in communication with the receiving space;
a motor having a base and a shaft, wherein the base couples with the housing, wherein the shaft rotatably couples with the base and firmly connects with the fan wheel; and
a resilient sealing member arranged between the housing and the base and in a ring shape, wherein the resilient sealing member has a central through hole for the shaft to extend through, wherein the resilient sealing member further has a radial extending portion extending in radial directions of the shaft, wherein the radial extending portion has a first surface and a second surface opposite to the first surface in an axial direction of the shaft perpendicular to the radial directions, with the first and second surfaces abutting against the housing and the base respectively, wherein the resilient sealing member has an annular flange protruding from one of the first and second surfaces away from another of the first and second surfaces in the axial direction of the shaft, and wherein the one of the first and second surfaces having the annular flange abuts with the housing or the base through the annular flange.

2. The gas blower as claimed in claim 1, wherein the resilient sealing member has another annular flange, wherein the annular flange and the other annular flange protrude from the first and second surfaces in the axial direction of the shaft respectively, wherein the first surface abuts with the housing through the annular flange on the first surface, wherein a remaining portion of the first surface radially outward of the annular flange is spaced from the housing, wherein the second surface abuts with the base through the other annular flange on the second surface, and wherein a remaining portion of the second surface radially outward of the other annular flange is spaced from the base.

3. The gas blower as claimed in claim 2, wherein the annular flange and the other annular flange are aligned with each other in the axial direction of the shaft.

4. The gas blower as claimed in claim 2, wherein the annular flange and the other annular flange are misaligned with each other in the axial direction of the shaft.

5. The gas blower as claimed in claim 1, wherein another one or more annular flanges protrude from the one of the first and second surfaces in the axial direction of the shaft.

6. The gas blower as claimed in claim 1, wherein the annular flange is arranged at an outer free edge of the radial extending portion away from the central through hole.

7. The gas blower as claimed in claim 1, wherein the radial extending portion is in a disk shape and abuts with both the housing and the base in the axial direction of the shaft.

8. The gas blower as claimed in claim 1, wherein the housing further has a through hole in communication with the receiving space, wherein the base of the motor has a shaft tube, wherein the shaft tube is in alignment with the through hole of the housing and the central through hole of the resilient sealing member, and wherein the shaft extends through the shaft tube, the through hole of the housing and the central through hole of the resilient sealing member to connect with the fan wheel.

9. The gas blower as claimed in claim 8, wherein the resilient sealing member further has an axial extending portion formed on a periphery of the central through hole and extending in the axial direction of the shaft, and wherein the axial extending portion extends into the shaft tube and abuts against an inner periphery of the shaft tube.

10. The gas blower as claimed in claim 9, wherein a bearing is received inside the shaft tube and couples with the shaft, wherein the axial extending portion inside the shaft tube is arranged between the bearing and the shaft tube, wherein the axial extending portion has an annular lip extending toward the shaft to cover the bearing, and wherein the annular lip is sandwiched between an end face of the bearing and an inner protrusion in the shaft tube.

11. The gas blower as claimed in claim 10, further comprising a buffer washer surrounding the shaft and sandwiched by the fan wheel and an inner ring of the bearing.

12. The gas blower as claimed in claim 8, wherein a bearing and a buffer member are arranged inside the shaft tube, the bearing couples with the shaft, and the buffer member is axially arranged between the bearing and an inner protrusion of the shaft tube and abuts with an outer ring of the bearing and the inner protrusion of the shaft tube by two ends respectively.

13. The gas blower as claimed in claim 8, wherein the shaft couples with a permanent magnet module, wherein a bearing and a buffer member are arranged inside the shaft tube, wherein the bearing couples with the shaft, and wherein the buffer member is axially arranged between the bearing and the permanent magnet module and abuts with an inner ring of the bearing and the permanent magnet module by two ends respectively.

14. The gas blower as claimed in claim 1, wherein the shaft has an engaging groove, and a fixing plate is disposed in the housing and coupled with the fan wheel and the engaging groove.

15. The gas blower as claimed in claim 1, wherein the annular flange has solid cross sections, wherein the thickness of the resilient sealing member is greater at the annular flange than spaced from the annular flange.

16. The gas blower as claimed in claim 1, wherein the annular flange has a semi-circular cross section perpendicular to a plane extending perpendicularly to the first surface and the second surface of the radial extending portion.

17. The gas blower as claimed in claim 16, wherein the radial extending portion has a thickness in the axial direction between the first surface and the second surface, and wherein the annular flange has a maximum length in the axial direction larger than the thickness of the radial extending portion.

18. The gas blower as claimed in claim 3, wherein the annular flange and the other annular flange together have a circular cross section perpendicular to a plane extending perpendicularly to the first surface and the second surface of the radial extending portion, wherein the radial extending portion has a thickness in the axial direction between the first surface and the second surface, and wherein each of the annular flange and the other annular flange has a maximum length in the axial direction larger than the thickness of the radial extending portion.

19. The gas blower as claimed in claim 9, wherein the radial extending portion includes an inner end radially inwards of the annular flange, wherein the resilient sealing member further includes a transition section extending radially outward from an end of the axial extending portion and having an outer end radially outwards of the axial extending portion, wherein the outer end of the transition section is spaced from the inner end of the radial extending portion in the axial direction and in a radial direction perpendicular to the axial direction, wherein the resilient sealing member further includes an inclined section extending between the outer end of the transition section and the inner end of the radial extending portion, wherein the axial extending portion, the transition section, and the inclined section together define a compartment, wherein a portion of the shaft tube is received in the compartment, and wherein the portion of the shaft tube includes an end face abutting the transition section.

20. The gas blower as claimed in claim 19, wherein the transition section includes an annular abutting portion and an annular arcuate portion having the outer end of the transition section, wherein the end face of the portion of the shaft tube abuts the annular abutting portion, wherein the annular arcuate portion is interconnected between the annular abutting portion and the inclined section, and wherein the portion of the shaft tube received in the compartment is spaced from an inner face of the inclined section in the radial direction.

* * * * *